United States Patent [19]

Seki et al.

[11] Patent Number: 4,667,283

[45] Date of Patent: May 19, 1987

[54] POWER CONVERTER APPARATUS INCLUDING A CHOPPER REGULATED INVERTER SYSTEM

[75] Inventors: Nagataka Seki; Kouichi Kaneko, both of Fuchu, Japan

[73] Assignee: Kabushiki Kaisha Toshiba, Kawasaki, Japan

[21] Appl. No.: 796,735

[22] Filed: Nov. 12, 1985

[30] Foreign Application Priority Data

Nov. 9, 1984 [JP]  Japan ................................ 59-236265

[51] Int. Cl.[4] ............................................. H02M 7/48
[52] U.S. Cl. ........................................ 363/95; 363/124
[58] Field of Search ................... 323/906; 363/16, 28, 363/40, 71, 95, 97, 124, 131, 135

[56] References Cited

U.S. PATENT DOCUMENTS

| 4,002,958 | 1/1977 | Akamatsu | 363/44 |
| 4,048,554 | 9/1977 | Stich | 363/138 |
| 4,050,006 | 9/1977 | Stich | 363/138 |
| 4,079,445 | 3/1978 | Hufnagel | 363/71 |
| 4,212,056 | 7/1980 | Kitamura et al. | 363/98 |
| 4,247,887 | 1/1981 | Chin | 363/37 |
| 4,506,319 | 3/1985 | Akamatsu | 363/138 |

OTHER PUBLICATIONS

U.S. Publication, "Principles of Inverter Circuits"; Bedford and Hoft; 1964.

Primary Examiner—Patrick R. Salce
Assistant Examiner—Jeffrey Sterrett
Attorney, Agent, or Firm—Oblon, Fisher, Spivak, McClelland & Maier

[57] ABSTRACT

A power converter apparatus for use in supplying power from a DC power source to a load, including a chopper connected to the DC power source; an inverter connected to a DC output of the chopper for supplying converted AC power to the load; an error amplifier for detecting an output voltage of the power converter apparatus and controlling the output voltage so as to maintain the output voltage equal to a predetermined reference value; and a voltage control circuit for generating a gate signal for the chopper, including an oscillator circuit for producing a variable frequency signal having a frequency varied in accordance with an output signal of the error amplifier, and a phase shifter for producing the gate signal with a pulse width varied in synchronism with the output signal of the oscillator circuit and for applying the pulse width varied gate signal to the chopper. In this way the chopper frequency is decreased to improve the operating efficiency during light-load operation.

8 Claims, 10 Drawing Figures

POWER CONVERTER APPARATUS INCLUDING A CHOPPER REGULATED INVERTER SYSTEM

BACKGROUND OF THE INVENTION

1. Field of the Invention

This invention relates to a power converter apparatus including a chopper and an inverter, and more particularly to a power converter apparatus which utilizes as a DC power source a solar battery or the like and which is therefore provided with large fluctuations in voltage.

2. Discussion of Background

In general, a solar battery is widely utilized for a power supply system that supplies specified power through a power converter apparatus constituted by a chopper and an inverter to an independent load which can be another power system. Such a solar battery has voltage-current and power characteristics as shown in FIG. 1 which characteristics differ as a function of the amount of incident solar energy. In FIG. 1, the voltage-current characteristics are shown by solid lines, and the power characteristics are shown by dotted lines. The respective characteristics indicate a tendency for both the current and power to increase as the amount of incident solar energy increases.

As can be seen from the characteristics shown in FIG. 1, a solar battery has the disadvantage that, due to its large fluctuations in voltage, power to be supplied decreases when an excessive amount of current is utilized. However, although the power to be supplied varies drastically depending upon the amount of incident solar energy, the battery voltage which produces maximum power outputs is constant irrespective of the amount of incident solar energy.

On the other hand, a power converter apparatus has been designed as a self-commutated inverter in order to receive maximum power from a solar battery, with the maximum power obtained in correspondance with the respective amounts of incident solar energy so as to supply the same to another power system. This is because when operating cooperatively with another power system which cannot be controlled, the output voltage and phase of the self-commutated inverter apparatus should be controlled.

The conventional converter apparatus is constituted by a chopper and an inverter. Installation of the chopper at the DC input of the inverter allows the chopper to perform a constant output voltage control, and the inverter to control the output pulse width to a constant value, whereby the harmonics components in the output voltage of the inverter are reduced.

In the power converter system that utilizes the solar battery for a power source, there is substantially no period throughout the year in which the power converter apparatus receives a maximum power output from the solar battery, i.e., the period to perform a full load operation, and the average load factor thereof throughout the year is approximately 20 to 80%, so that the efficiency of the power converter during light-load operation apparatus is regarded as of major importance. In addition, the solar battery currently has an extremely high manufacturing cost per kw, so that it is particularly significant to reduce the loss of the power converter apparatus as compared to the system that utilizes another power source such as a storage battery.

However, in the conventional power converter apparatus, as described above, installation of the chopper prior to the inverter stage is advantageous because the output filter circuit can be made compact and the control circuit simplified. On the other hand, disadvantages arise in that the loss developed by switching the DC circuit with the chopper is not reduced even during light-load operation.

In general, the total loss Pt of the switching elements employed within the chopper can be expressed by the following equation:

$$P_t = (P_{on} + P_{off}) \times f + P_s \tag{1}$$

where $P_s$ represents the loss in a steady ON state, $P_{on}$ a switching loss when turned on, $P_{off}$ a switching loss when turned off, and f a switching frequency, respectively. In equation (1), the steady ON state loss $P_s$ of the second term is proportional to a steady ON current. However, the first term $((P_{on}+P_{off}) \times f)$ is a component proportional to the switching frequency of f. Namely, the loss of the chopper can be separated into a fixed loss of the first term and a load loss of the second term. This results in the disadvantage that when the power converter apparatus is in light-load operation, the proportion of the fixed loss becomes greater, whereby the efficiency of the power converter apparatus becomes lowered. Moreover, additional disadvantages exist in that should the switching frequency f be lowered in order to reduce the fixed loss without due consideration for its various aspects, i.e., without consideration of the load, the quick-response characteristics of chopper control are drastically deteriorated. Further, the DC reactor required for such a chopper is exceptionally bulky, whereby the economic advantages and compactness of the power converter apparatus are also adversely affected.

SUMMARY OF THE INVENTION

Accordingly, one object of this invention is to provide a novel power converter apparatus having improved efficiency of operation, particularly under light-load operation.

Another object of this invention is to provide a power converter apparatus having a good response characteristic.

Yet another object of this invention is to provide a novel power converter apparatus capable of maintaining operation at a maximum power output of variable power source, such as a solar battery, coupled to an input of the power converter apparatus.

A further object of this invention is to provide a power converter apparatus having improved efficiency of operation and which is compact and inexpensive to construct.

These and other objects are achieved according to this invention by providing a novel power converter apparatus for use in supplying power from a DC power source to a load, including a chopper connected to the DC power source, an inverter connected to a DC output of the chopper for supplying converted AC power to the load, error amplifier means for detecting an output voltage of the power converter apparatus and controlling the output voltage so as to maintain the output voltage equal to a predetermined reference value, and a voltage control circuit for generating a gate signal for the chopper, including oscillator means for producing a variable frequency signal having a frequency varied in accordance with an output signal of said error amplifier, and a phase shifter for producing a gate signal having a pulse width varied in synchronism with the output signal of the oscillator means and for applying the pulse width varied gate signal to the chopper. In this way the chopper switching frequency is decreased to improve the operation efficiency during light-load operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
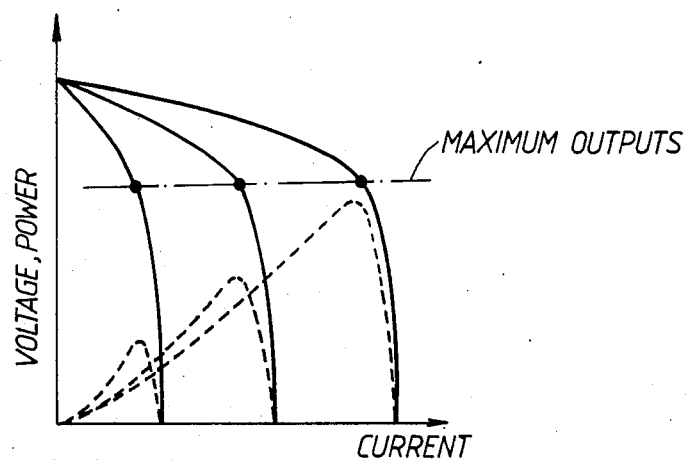
FIG. 1 is graph of a characteristic diagram of a solar battery illustrating relationships of output voltage versus output current and output voltage versus output power.
Figure 2:
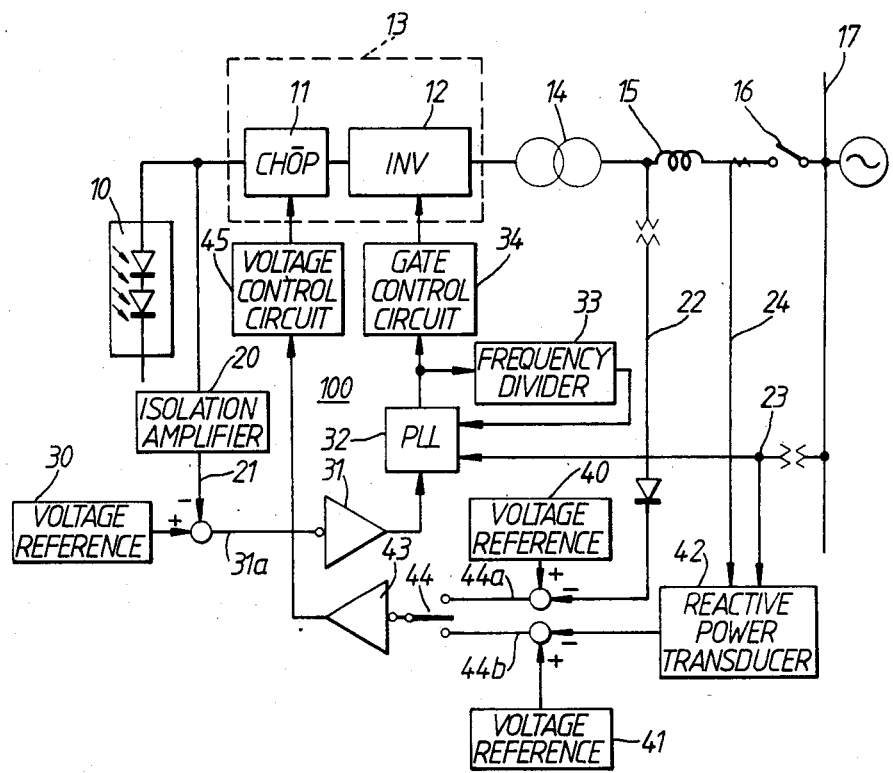
FIG. 2 is a block diagram illustrating a power converter apparatus connected in parallel with a power system according to one embodiment of the present invention.

Referring now to the drawings, wherein like reference numerals designate identical or corresponding parts throughout the several views, and more particularly to FIG. 2 thereof, a DC output of a solar battery 10 is converted into AC power by a power converter apparatus 13, and the voltage of the thus converted AC power is converted into a specified voltage by a transformer 14. The thus converted AC power with the specified voltage is supplied to a power system 17 through a coupling reactor 15 and a switching gear 16.

The power converter apparatus 13 includes a chopper 11 and an inverter 12. Installation of the chopper 11 at the DC input of the inverter 12 allows the chopper 11 to perform a constant output voltage control, and allows the inverter 12 to maintain the output pulse width constant, whereby the harmonics components in the output voltage of the inverter 12 are reduced. By use of the above-described control, advantageously the capacity of an output filter circuit (not shown) that eliminates the harmonics in the output voltage can be reduced, and the control circuit of the inverter 12 can be simplified.

In a control circuit 100 of FIG. 2, a voltage reference 40 and an inverter output voltage 22 are compared so as to produce a difference signal 44a, which in turn, is fed through a changeover switch 44 into an error amplifier 43. Similarly, a reactive power reference 41 and an output of a reactive power transducer 42 are compared so as to produce a difference signal 44b, which in turn, is fed through the changeover switch 44 into the error amplifier 43. The output of the error amplifier 43 is fed into a voltage control circuit 45. Changeover switch 44 is controlled based on the state of switching gear 16. When switching gear 16 is closed, switch 44 connects difference signal 44a to amplifier 43. When switching gear 16 is open, switch 44 connects difference signal 44b to amplifier 43.

Figure 3:
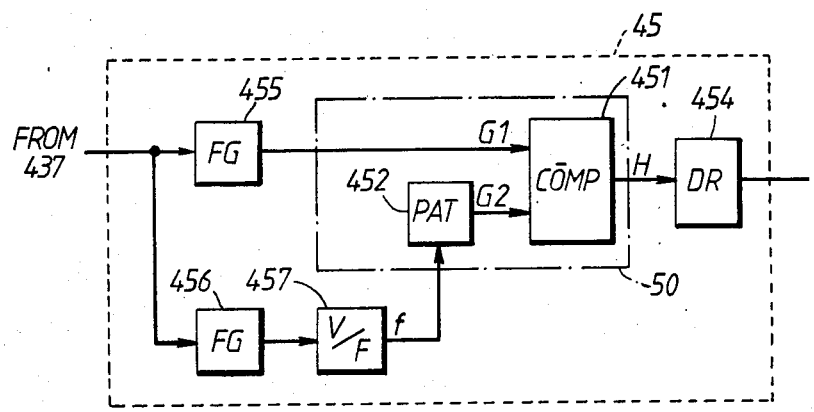
FIG. 3 is a block diagram illustrating a specific circuit configuration of a portion of a voltage control circuit shown in FIG. 2.

The voltage control circuit 45 generates a gate signal for the chopper 11, and a specific configuration of the voltage control circuit 45 is shown in FIG. 3.

Figure 4:
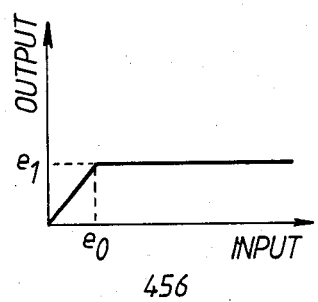
FIGS. 4-6 are characteristic diagrams illustrating operation of a voltage control circuit shown in FIG. 3.
Figure 5:
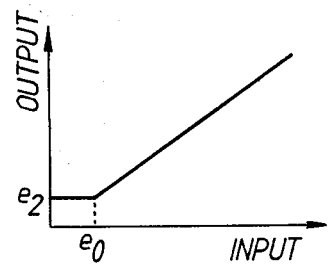

In FIG. 3, reference numerals 455 and 456 represent function generators which convert the output signal of the error amplifier circuit 43 in correspondance with respective predetermined functions as shown in FIGS. 5 and 4, respectively. Reference numeral 457 designates a voltage/frequency (v/F) converter that converts the output signal from the function generator 456 into a frequency proportional thereto, 452 designates a triangular waveform generator that generates a triangular waveform signal in synchronism with the frequency from the v/F converter 457, and 451 designates a comparator that compares the output signals of the triangular waveform generator 452 and the function generator 455, respectively. The comparator 451 and the triangular waveform generator 452 are defined generically as a phase shifter 50.

The function generator 456 has such characteristics as shown in FIG. 4. In FIG. 4, within a region in which the output of the error amplifier 43 is small (i.e., below a specified input level $e_o$), the function generator 456 produces an output that increases in proportion to the output of the error amplifier 43, while above the specified level $e_o$, the function generator 456 produces a constant output signal $e_1$. The v/F converter 457 produces a frequency proportional to the output signal of the function generator 456, such that the output frequency of the v/F converter 457 increases or remains constant depending upon whether the output of the error amplifier 43 is below or above the specified level $e_o$.

On the other hand, the function generator 455 has the characteristic shown in FIG. 5, such that within a region in which the output of the error amplifier 43 is below a specified input level $e_o$, the function generator 455 produces a constant output signal $e_2$, while when above the specified level $e_o$, the function generator 455 produces an output that increases in proportion to the output from the error amplifier 43.

Figure 6:
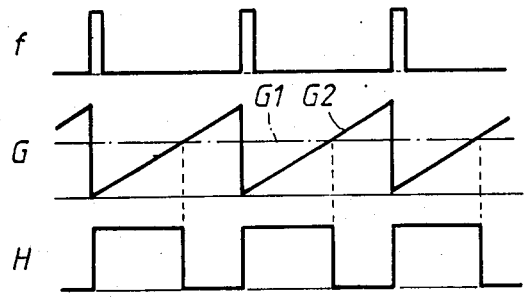

In FIG. 3, a triangular waveform generator 452 receives an output signal of an oscillator formed by the combination of function generator 456 and v/F converter 457 so as to produce a triangular waveform signal in synchronism with the output signal of this oscillator as shown in FIG. 6. The output signals of the triangular waveform generator 452 and the function generator 455 are fed into a comparator 451 so as to be compared in magnitude with each other.

In FIG. 6, signal (f) represents the output signal of the v/F converter 457, and the frequency thereof is varied in accordance with characteristics shown in FIG. 4; signal (G) represents an output signal $G_2$ of the triangular waveform generator 452 and an output signal $G_1$ of the function generator 455 that has the characteristics shown in FIG. 5, and during periods when the latter is greater than the former, the comparator 451 produces an output signal of logic "1" represented by signal (H) shown in FIG. 6. When the output signal H of the comparator 451 is a logic "1", this causes the switching elements of the chopper 11 to be in conduction through a drive circuit 454.

The output signal of the triangular waveform generator 452 has a constant slope, so that in accordance with the magnitude of the output signal of the error amplifier 43, the comparison threshold level of the comparator 451 varies such that the conduction period of the switching elements of the chopper 11 is varied.

On the other hand, in the inverter control circuit, a solar battery voltage is detected through a DC isolation amplifier 20 that isolates the control circuit 100 from the main circuit and also adjusts the voltage gain. The thus detected DC voltage value 21 is compared with a DC voltage reference 30 so as to reduce a difference 31a, which in turn, is fed into an error amplifier 31. Reference numeral 32 designates a so-called PLL (phase-locked loop) circuit that receives three separate signals such as (a) a signal which is an output of the error amplifier 31, (b) a signal which is a phase reference signal derived from a voltage 23 of the power system 17, and (c) a signal which is an output of a frequency divider 33 that divides an output frequency of the PLL circuit 32. An output frequency of the PLL circuit 32 is fed into a gate control circuit 34, which generates a gate signal for the inverter 12.

Figure 7:
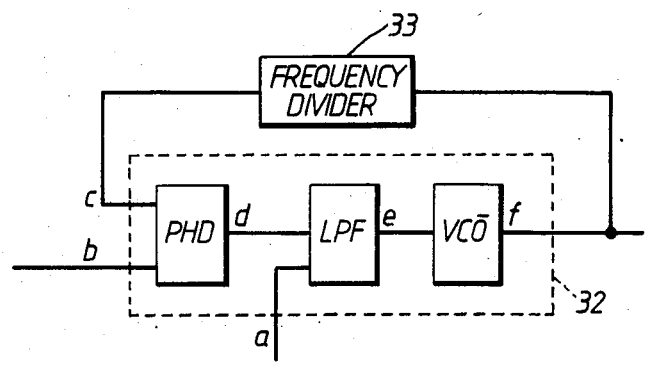
FIG. 7 is a block diagram illustrating a specific circuit configuration of the phase-lock loop (PLL) circuit of the power converter apparatus shown in FIG. 2.

An example of the PLL circuit 32, though conventionally well known, is next briefly described with reference to FIG. 7. PLL circuit 32 includes a phase error detector PHD, a low pass filter LPF, and a voltage controlled oscillator VCO. The phase detector PHD produces a signal (d) proportional to a phase difference between a phase reference signal (b) and a phase feedback signal (c). The signal (d) proportional to the phase difference is fed into the low pass filter LPF that eliminates the harmonics components thereof, and also amplifies the phase error. The voltage controlled oscillator VCO produces a frequency proportional to an output (e) of the low pass filter LPF. An output (f) of the voltage controlled oscillator VCO is fed into the frequency divider 33. When the number of stages in the frequency divider 33 is defined as N, an oscillating frequency of the voltage controlled oscillator VCO is N times the frequency of the phase reference signal (b). Here, N is an integer arbitrarily determined in accordance with the number of phases of the inverter 12 within the power converter apparatus 13. The output of the frequency divider 33 is fed into the phase error detector PHD as the phase feedback signal (c), so that the oscillating frequency of the voltage controlled oscillator VCO is automatically controlled such that the phase of the phase reference signal (b) coincides with the phase of the phase feedback signal (c). Here, the signal (a) of the PLL circuit 32, which is fed into the low pass filer LPF, functions such that a phase difference between the phase reference signal (b) and the phase feedback signal (c) can be arbitrarily determined.

Now, referring back to FIG. 2, the operation of the power converter apparatus of the invention is next described. For use as the phase reference signal (b) (FIG. 7) of the PLL circuit 32, a phase of the power system 17 is supplied, so that the output frequency of the PLL circuit is in synchronism with the phase of the power system 17. Thus, the phase of the power converter apparatus 13 is also in synchronism with the phase of the power system 17. When the switching gear 16 is opened, the input and output terminals of the error amplifier 31 are short-circuited by a switching device (not shown). As a result there is then no DC constant voltage control of the phase of the inverter 12 by use of the DC voltage difference 31a.

Next, when the switching gear 16 is closed while at the same time the input and output terminals of the error amplifier 31 are released from being short-circuited, the phase of the power converter apparatus 13 is automatically controlled such that the solar battery voltage becomes equal to the DC voltage reference 30. In addition, when the changeover switch 44 is switched so as to select the difference 44a, the inverter output voltage 22 of the transformer 14 is automatically controlled so as to equal the voltage reference 40. Further, in the case when the switching gear 16 is opened and the changeover switch 44 is switched so as to select the difference 44b, the output voltage of the power converter apparatus 13 is automatically controlled such that the reactive power of the power converter apparatus 13 becomes equal to the reactive power reference 41. As described above, in the method that controls the power converter apparatus 13, there is provided the advantage that the selection of the DC voltage reference 30 as an appropriate value, taking into consideration the characteristics of a solar battery to be connected to the power converter apparatus 13, allows the power supply system to invariably operate at a maximum output point of the solar battery 10, regardless of the amount of incident solar energy.

In the case when the changeover switch 44 is caused to select a difference 44a, the relationship between the output signal of the error amplifier 43 and a load factor of the power converter apparatus 13 will be as follows. When the power converter apparatus 13 supplies a large current in a heavy-load operation, the output voltage 22 of the inverter 12 is lowered due to a voltage drop developed in proportion to the output current, so that the error amplifier 43 operates so as to increase the output voltage of the chopper 11, whereby the output signal of the error amplifier 43 is increased. On the contrary, when the power converter apparatus 13 is in a light-load operation, the output current thereof is small as compared to the heavy-load operation, so that the amount of the voltage drop in the output voltage 22 of the inverter 12 also becomes small, whereby the error amplifier 43 operates so as to decrease the output voltage of the chopper 11. Consequently the output signal of the error amplifier 43 becomes small, and reaches its equilibrium with the voltage reference 40. Here, the relationship between the solar battery voltage $Ed_1$ and the output voltage $Ed_2$ of the chopper 11 can be stated as follows, $$Ed_2 = F(tw \cdot f_o) \times Ed_1 \qquad (2)$$

where F represents a known function that increases monotonously with respect to the input signal, tw a pulse width of the output signal of the comparator 451, and $f_o$ a frequency of the output signal of the v/F converter 457, respectively. Assuming the case when the output signal of the error amplifier 43 reaches in the vicinity of zero, the pulse width tw is limited to a constant value by means of the function generator 455, and the input variables of the function F are proportional to the frequency $f_o$. As can be seen from the characteristics of the function generator 456 shown in FIG. 2, when the input signal, that is, the output signal of the error amplifier 43 becomes smaller than the specified value $e_o$, the output signal of the function generator 456 decreases, and the frequency $f_o$ in the equation (2) also decreases. When the output signal of the error amplifier 43 is defined as $e_c$, and in the case of $e_c < e_o$, the frequency $f_o$ becomes such that $f_o = k_1 \cdot e_c$. Thus the output voltage $Ed_2$ can be expressed in terms of equation (2) as follows.

$$Ed_2 = F(K_1 \cdot t_w \cdot e_c) \times Ed_1 \qquad (3)$$

where $K_1$ represents a proportionality constant. Therefore, when the power converter apparatus 13 is being forced to perform a light-load operation, the frequency $f_o$ decreases so as to lower the fixed loss, so that such the disadvantage that the efficiency of the power converter apparatus 13 is lowered in light-load operation, as described above, can be overcome. Further, in the case of $e_c > e_o$, the frequency $f_o$ is constant and the pulse width $t_w$ is proportional to the output signal $e_c$ of the error amplifier 43 as shown in FIG. 3, and the output voltage $Ed_2$ can be expressed by use of the equation (2) as follows, $$Ed_2 = F(K_2 \cdot e_c \cdot f_o) \qquad (4)$$

where $K_2$ represents a proportionality constant. In accordance with equation (4), the input variables of the function F are varied in proportion to the output signal $e_c$ of the error amplifier 43. Therefore, the input variables of the function F are varied, in either case of equation (3) or equation (4), in proportion to the output signal $e_c$ of the error amplifier 43. Should $K_1$ and $K_2$ be selected as the same value, the output voltage of the chopper 11 can be modified into a linear relation to the output signal $e_c$ of the error amplifier 43. In addition, also in the case when the changeover switch 44 is caused to select the difference 44b, application of a specified bias voltage to the function generators 455 and 456 in accordance with the reactive power reference 41 can achieve similar advantages.

Hereinafter, another embodiment of the present invention in the case that the chopper 11 is a booster chopper will be described with reference to FIGS. 8-10.

Figure 8:
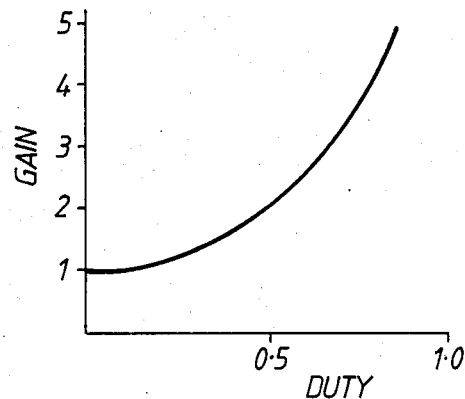
FIGS. 8-10 are characteristic diagrams illustrating operation of the power converter apparatus of the invention employing a booster chooper.

The operation between the input voltage and the output voltage of a booster chopper can be expressed by the following equation, $$Ed_2 = \frac{1}{1 - duty} \cdot Ed_1 \qquad (5)$$

and has a characteristic as shown in FIG. 8.

Figure 9:
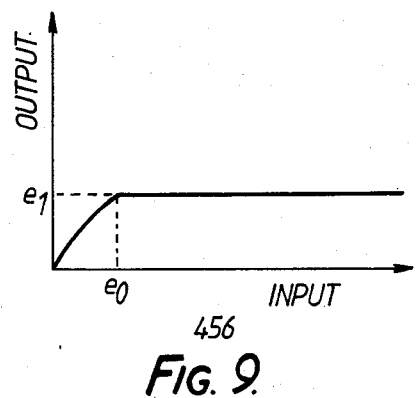
Figure 10:
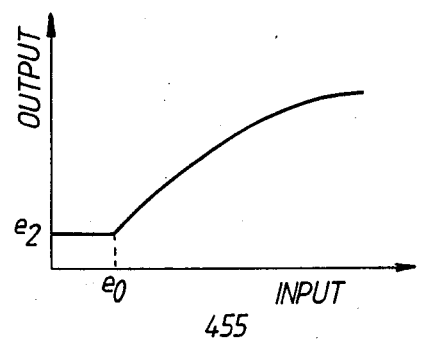

The function generator 456 of FIG. 3 then has a characteristic as shown in FIG. 9. Within a region in which the output of the error amplifier 43 is low (i.e., below a specified input level $e_o$), the function generator 456 produces an output that increases with increasing $e_o$ that is the reverse of the curve shown in FIG. 8, while above the specified level $e_o$, it produces a constant output signal $e_1$. The v/F converter 457 produces a frequency proportional to the output signal of the function generator 456, namely its output frequency increases or remains constant depending upon whether the output of the error amplifier 43 is below or above the specified level $e_o$. On the other hand, the function generator 455 has the characteristic as shown in FIG. 10. In FIG. 10, within a region in which the output of the error amplifier 43 is low (i.e., below the specified input level $e_o$), the function generator 455 produces a constant output signal $e_2$, while above the specified level $e_o$, it produces an output that increases in the characteristic which is the reverse of the curve shown in FIG. 8.

The advantages of this embodiment are that the gain of the output voltage of the booster chopper can be a constant value, and the output voltage of the chopper can be proportional to the output of the error amplifier 43. Further, in this embodiment, it is naturally possible to achieve the same advantage that the output power of solar battery can be more efficient, just as with the embodiment shown in FIG. 4 and FIG. 5.

The previous description has been made with regard to a power converter apparatus that utilizes a solar battery as a power source. However, even in the case of using a fuel cell which also has large fluctuations in the voltages between no-load and full-load operation, and whose efficiency is regarded as of major importance, the same advantages as the aforementioned can be similarly achieved. Further, in the above-described embodiments, the circuitry that utilizes a triangular waveform generator and a comparator has been described as a specific example of the phase shifter, however, the present invention is not limited to this embodiment.

Moreover, in the aforementioned embodiments, the switching elements of the chopper 11 have not specifically been described, however, it is naturally possible to achieve the same advantages by use of such switching elements as transistors, thyristors and gate-turn-off (GTO) thyristors that are generally available.

As described above, according to the present invention, there is provided a power converter apparatus constructed such that a chopper frequency can be varied in accordance with the output signal of the error amplifier, thus the efficiency of the power converter apparatus can be improved by lowering the chopper frequency in the case of a light-load operation, whereby the output power of solar battery can be more efficiently utilized as compared to the conventional power converter apparatus that utilizes a solar battery as a power source, and whereby the quick-response characteristics of chopper control are not deteriorated in normal or heavy-load operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter apparatus for use in supplying power from a DC power source to a load, comprising:
   a chopper, connected to said DC power source;
   an inverter connected to a DC output of said chopper for supplying converted AC power to said load;
   error amplifier means for detecting an output voltage of said power converter apparatus and controlling the output voltage so as to maintain said output voltage equal to a predetermined reference value; and
   a voltage control circuit for generating a gate signal for said chopper, including,
   oscillator means for producing a variable frequency output signal having a frequency varied in accordance as a first predetermined function of an output signal of said error amplifier, and
   a phase shifter for producing said gate signal with a pulse width varied as a second predetermined function of the output signal of said error amplifier, said phase shifter producing said gate signal in synchronism with said variable frequency output signal of said oscillator means, said phase shifter applying said gate signal to said chopper.

2. A power converter apparatus according to claim 1, wherein said oscillator means comprises:
   means for producing a low frequency signal in the case of a light-load operation.

3. A power converter apparatus according to claim 2, wherein said oscillator means comprises:
   means for producing a constant frequency signal within a region in which the output of said error amplifier is larger than a specified level; and
   means for producing a lower frequency signal within a region in which the output signal of said error amplifier is smaller than said specified level.

4. A power converter apparatus according to claim 3, wherein:
   said oscillator means comprises means for producing a variable frequency signal which is proportional to an output signal of said error amplifier; and
   said phase shifter comprises means for producing a constant pulse width gate signal within a region in which the output signal of said error amplifier is smaller than said specified level.

5. A power converter apparatus according to claim 3, wherein:
   said chopper comprises a booster chopper;
   said oscillator means comprises means for producing a variable frequency signal having a characteristic which is the inverse of an Input-Output voltage charactristics of said chopper in relation to the output signal of said error amplifier; and
   said phase shifter comprises means for producing a constant pulse width gate signal within a region in which the output signal of said error amplifier is smaller than said specified level.

6. A power converter apparatus according to claim 1, wherein said oscillator means comprises:
   means for producing a constant frequency signal within a region in which the output of said error amplifier is larger than a specified level; and
   means for producing a lower frequency signal within a region in which the output signal of said error amplifier is smaller than said specified level.

7. A power converter apparatus according to claim 6, wherein:
   said chopper comprises a booster chopper;
   said oscillator means comprises means for producing a variable frequency signal having a characteristic which is the inverse of an Input-Output voltage characteristics of said chopper in relation to the output signal of said error amplifier; and
   said phase shifter comprises means for producing a constant pulse width gate signal within a region in which the output signal of said error amplifier is smaller than said specified level.

8. A power converter apparatus according to claim 6, wherein:
   said oscillator means comprises means for producing a variable frequency signal which is proportional to the output signal of said error amplifier; and
   said phase shifter comprising means for producing a constant pulse width gate signal within a region in which the output signal of said error amplifier is smaller than said specified level.

* * * * *